United States Patent [19]

Sweeney

[11] Patent Number: 5,907,906
[45] Date of Patent: Jun. 1, 1999

[54] ROTARY BLADE SPACER FOR CORRUGATED TUBING CUTTER

[75] Inventor: Michael A. Sweeney, Kent, Ohio

[73] Assignee: Parker-Hannifin Corporation, Cleveland, Ohio

[21] Appl. No.: 09/009,527

[22] Filed: Jan. 20, 1998

Related U.S. Application Data

[XX .
[60] Provisional application No. 60/049,587, Jun. 13, 1997.

[51] Int. Cl.$^6$ .................................................. B23D 21/08
[52] U.S. Cl. ............................................... 30/101; 30/102
[58] Field of Search ................................. 30/92, 93, 101, 30/102, 95, 286, 289

[56] References Cited

U.S. PATENT DOCUMENTS

| | | |
|---|---|---|
| 294,339 | 2/1884 | Sweetland . |
| 967,635 | 8/1910 | Hewitt ........................................ 30/101 |
| 1,737,889 | 12/1929 | McKnight et al. . |
| 1,833,980 | 12/1931 | Thewes . |
| 2,515,627 | 7/1950 | Capewell .................................. 30/102 |
| 2,878,550 | 3/1959 | Schlueter .................................. 30/101 |
| 3,376,638 | 4/1968 | Bjalme et al. . |
| 3,929,044 | 12/1975 | Beachet .................................... 30/102 |
| 3,965,571 | 6/1976 | Lyman ...................................... 30/92 |
| 4,063,355 | 12/1977 | Netzel . |
| 4,078,304 | 3/1978 | Netzel . |
| 4,307,512 | 12/1981 | Phillips ..................................... 30/94 |
| 4,402,136 | 9/1983 | Rast ......................................... 30/101 |
| 4,446,620 | 5/1984 | Velte ........................................ 30/96 |
| 5,230,150 | 7/1993 | Sperti ....................................... 30/101 |
| 5,461,955 | 10/1995 | Weisshaar ................................ 30/96 |
| 5,581,886 | 12/1996 | Sesser et al. ............................ 30/101 |

FOREIGN PATENT DOCUMENTS 0 707 914A1  4/1996  European Pat. Off. .

OTHER PUBLICATIONS

Catalog TP197 of OmegaFlex entitled "TracPipe Runs Circles Around Black Iron Pipe".

Design and Installation Guide, dated Apr. 1996, of Titeflex Corporation.

*Primary Examiner*—Hwei-Siu Payer
*Attorney, Agent, or Firm*—John A. Molnar, Jr.

[57] ABSTRACT

A blade spacer for use in the cutting a length of corrugated tubing with a cutter of a variety including a rotary cutting blade rotatable circumferentially about the tubing within a plane defined by a radial axis of the blade. The spacer is mountable to the cutter coaxially with the axis of rotation of the blade for positioning the blade within a root portion of the tubing such that the radial axis of the blade is aligned within the root portion to define the plane as being generally equidistant from the side walls of the root portion and as being generally perpendicular to the central longitudinal axis of the tubing. The spacer is provided to invest the lateral surfaces of the blade centrally therewithin and as having a generally circular periphery extending radially outwardly from the axis of rotation of the blade to a bushing region. The bushing is configured to be received between the walls of the root portion of the tubing and terminates inwardly of the outer diameter of the blade to reveal at least a portion of the cutting edge thereof. The bushing region further is provided as having an outer surface which defines with the axial extent of the blade lateral surfaces an axial dimension which is selected relative to the root portion pitch such that the outer surface of the bushing region is made to bear upon the root portion walls effecting the desired positioning of the radial axis of the blade.

21 Claims, 3 Drawing Sheets

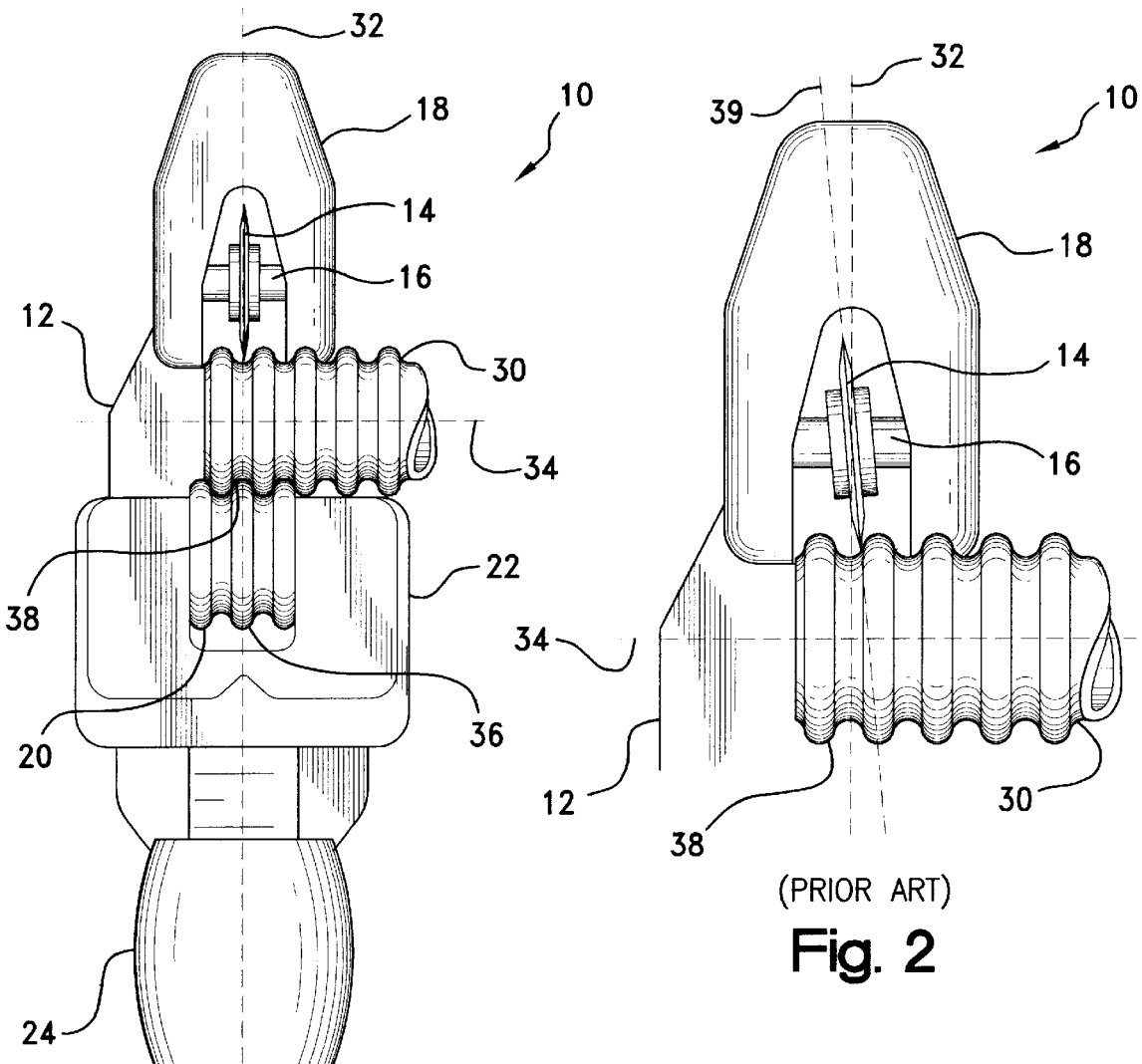
(PRIOR ART)
Fig. 1
(PRIOR ART)
Fig. 2
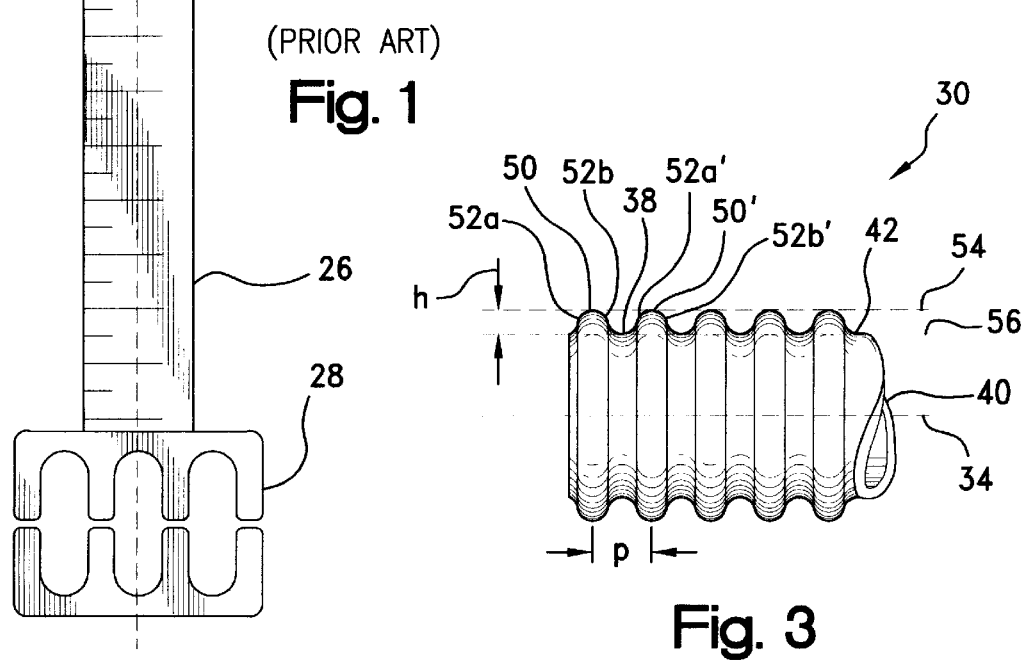
Fig. 3

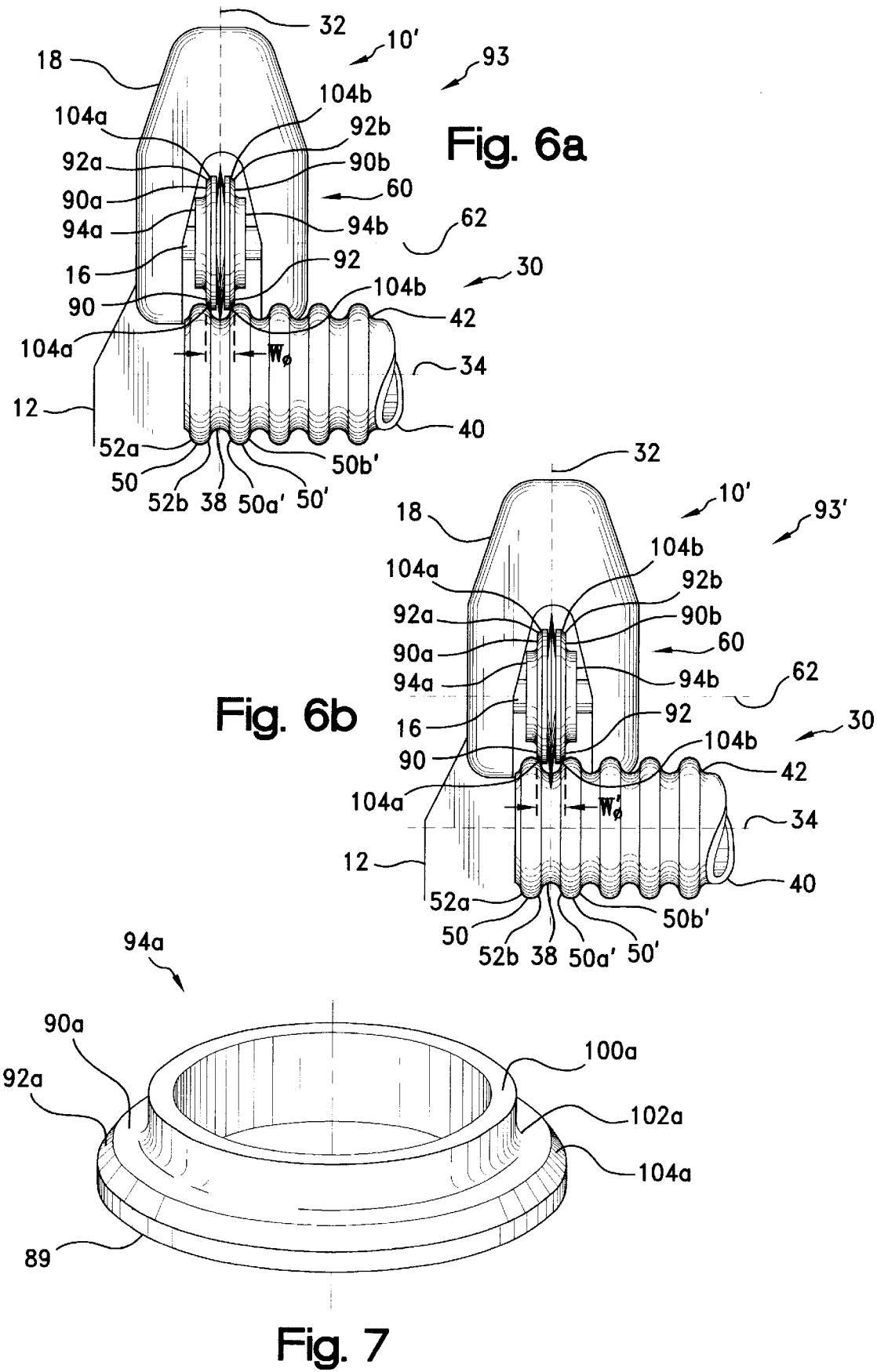

5,907,906

ROTARY BLADE SPACER FOR CORRUGATED TUBING CUTTER

RELATED CASES

The present application claims priority to U.S. Provisional Application Ser. No. 60/049,587, filed Jun. 13, 1997.

BACKGROUND OF THE INVENTION

The present invention relates generally to improvements in implements for use in the cutting of corrugated tubing, and more particularly to a rotary blade spacer for a cutting implement of a variety which includes a rotary cutting blade, the blade spacer being configured to be received between the corrugations of the tubing for the centering of the blade therewithin.

Corrugated tubing, often fabricated of stainless steel, copper, or the like and jacketed with a plastic material, is commonly employed in residential or commercial building constructions as a transitional fluid conduit extending between an appliance or other machine and a rigid auxiliary line, pipe, or other connection of a fuel source which typically is natural gas, propane, or the like. The flexibility of such tubing facilitates the alignment of couplings and other connections, and also accommodates limited movement of the appliance or machine with respect to the rigid connection of the fuel source.

More recently, tubing of such type has been proposed as a substitute for traditional hard, i.e., inflexible, steel or iron "black" pipe in gas line applications for residential and commercial construction. Again, the flexibility of the tubing facilitates its installation through walls, ceilings, and floors and, especially, the alignment of the tubing connections. Such tubing, moreover, is lightweight, easy to carry, requires no threading or heavy equipment therefor, allows the use of fewer fitting connections, and exhibits less leak potential than conventional, hard piping. Corrugated tubing of the type herein involved additionally is used in other fluid transport applications such as in air conditioning, hydraulics, and general plumbing, and also as conduit for electrical applications. Tubing manufacturers include: Parflex Division of Parker-Hannifin Corp., Ravenna, Ohio.; Titeflex Corp., Springfield, Mass.; OmegaFlex, Inc., Exton, Pa.; Wardflex Blossburg, Pa.; Tru-Flex Metal Hose Corp., Howell, Mich.; and Flex-Pression Ltd., St. Laurent, Quebec, Canada.

It is common practice to cut or otherwise section corrugated tubing to length with a conventional pipe or tubing cutter of a hand-operable variety. Cutters of such type, a representative one of which is shown at 10 in FIG. 1, have long been known in the pipe cutting art and typically involve an arrangement which includes a C-shaped frame, 12. As may be seen in FIG. 1, a generally disc-shaped cutting blade, 14, is rotatably journalled on an axle, 16, mounted at a first end, 18, of the frame 12. A roller, 20, is disposed in opposition to blade 14 as rotatably mounted on a carriage, 22. Carriage 22, in turn, is slidably movably mounted on the frame 12 intermediate a second end, 24, thereof and blade 16. A pressure screw, 26, is threadably received through a bore formed within the second end 24 of frame 12 as operably coupled at one end in a force transmitting relationship with carriage 22 for advancing roller 20 toward blade 14. A knob or other handle, 28, is provided at the other end of screw 26 for the hand-operated rotation thereof controlling the advancement of carriage 22 along frame 12.

With a length of tubing, 30, disposed and supported intermediate blade 14 and roller 20, cutter 10 may be revolved radially circumferentially about the tubing within a plane, represented by line 32, perpendicular to the longitudinal axis, 34, of the tubing 30. As the cutter 10 is revolved and with advancement force being continuously applied to carriage 22 and roller 20 via the rotation of screw 26, the wall of the tubing 30 is cut successively deeper with each revolution of the cutter by the rotation of the blade along the tubing surface. Tubing cutters of this type are further described in U.S. Pat. Nos. 294,339; 1,833,980; and 3,376,638, and are manufactured commercially by Reed Manufacturing, Erie, Pa., Rigid Tool, Cleveland, Ohio., and Stride Co., Ellicottville, N.Y.

Other tubing and pipe cutters utilizing rotary cutting wheels are described in U.S. Pat. Nos. 1,737,889; 4,307,512; 4,402,136; 5,230,150; 5,461,955; and 5,581,886. Other cutters specifically adapted for cutting corrugated tubing are described in U.S. Pat. Nos. 4,078,304 and 4,063,355. These cutters involve a saddle-arrangement of a frame or ring formed of a hinged pair of semi-circular members which may be clamped and rotated circumferentially about the tubing. One or more rotary blades are carried by the frame for the cutting of the tubing wall.

Further with respect to cutters for corrugated tubing, and as may be seen in FIG. 1 for the representative cutter 10, the above-described conventional C-clamp devices have been modified to include a roller 20 which is profiled as having one or more circumferentially ridges, one of which is designated at 36, each configured to be received within a corresponding corrugation root, 38, of the tubing. Despite that modification, however, it has been observed in the preparation of the terminated end of the tubing for a flared connection with a fitting that the cut produced by tubing cutters of conventional design can sometimes be irregular. In this regard, and as is illustrated in the enlarged view of cutter 10 depicted in FIG. 2, any axial movement, represented by line 39, of blade 14 within the corrugation root 38 can result in an off-axis cut. Such movement may be caused by any number of factors, but typically is the result of a loose-fitting blade, a variation in the pitch of the tubing corrugations which effects a misalignment of the roller, or the operator failing to properly align the cutting blade within the center of the corrugation. The off-axis cut may produce an incomplete flare or otherwise may deleteriously affect the flaring of the tubing end. Depending upon the fitting which is employed, an incomplete flare may prevent the complete seating of the tubing end with the fitting which is necessary to achieve a fluid-tight seal.

As the use of corrugated tubing in gas line and other fluid transfer applications continues to increase, it will be appreciated that further improvements in the design of cutting implements therefor would be well-received by both industry and consumers alike. Preferred improvements would speed and simplify the cutting of the tubing while assuring that a straight cut is obtained which facilitates subsequent flaring operations and minimizes the potential for leaks and the like.

SUMMARY OF THE INVENTION

The present invention is directed to a rotary blade spacer for a cutting implement used in the cutting of corrugated or convoluted tubing having alternating crest portions and root portions which are defined between each pair of adjacent crest portions. The spacer is configured to be received within the root portions of the tubing and with the blade centrally disposed therein. The spacer is of an axial extent which substantially fills the space between the bade and each of the adjacent crest portions of the tubing to centrally locate the blade in the root portion within a plane which is generally perpendicular to the longitudinal axis of the tubing. In this way, a straight cut is assured. Advantageously, clearance may be provided between the inner radial surfaces of the spacer and the radial edge surfaces of the blade to allow for the axial inward deflection of the spacer relative to the blade. Such deflection provides a slight tolerance in the axial extent of the spacer which accommodate for variations in the corrugation spacing of the tubing.

It therefore is a feature of a preferred embodiment of the present invention to provide a blade spacer for use in the cutting a length of corrugated tubing with a cutter of a variety including a rotary cutting blade which is rotatable circumferentially about the tubing within a plane defined by a radial axis of the blade. The spacer is mountable to the cutter coaxially with the axis of rotation of the blade for positioning the blade within a root portion of the tubing such that the radial axis of the blade is aligned within the root portion to define the plane as being generally equidistant from the side walls of the root portion and as being generally perpendicular to the central longitudinal axis of the tubing. The spacer is provided to invest the lateral surfaces of the blade centrally therewithin and as having a generally circular periphery extending radially outwardly from the axis of rotation of the blade to a bushing region. The bushing region is configured to be received between the walls of the root portion of the tubing and terminates inwardly of the outer diameter of the blade to reveal at least a portion of the cutting edge thereof. The bushing region further is provided as having an outer surface which defines with the axial extent of the blade lateral surfaces an axial dimension which is selected relative to the root portion pitch to effect the desired positioning of the radial axis of the blade.

It is a further feature of the preferred embodiment of the present invention to provide a blade spacer for use in the cutting a length of corrugated tubing with a cutter of a variety which supports the tubing between a roller and an oppositely-disposed rotary cutting blade rotatable circumferentially about the tubing within a plane defined by a radial axis of the blade. The spacer is mountable to the cutter coaxially with the axis of rotation of the blade for positioning the blade within a root portion of the tubing such that the radial axis of the blade is aligned within the root portion to define the plane as being generally equidistant from the side walls of the root portion and as being generally perpendicular to the central longitudinal axis of the tubing. The spacer is provided to invest the lateral surfaces of the blade centrally therewithin and as having a generally circular periphery extending radially outwardly from the axis of rotation of the blade to a bushing region. The bushing region is configured to be received between the walls of the root portion of the tubing and terminates inwardly of the outer diameter of the blade to reveal at least a portion of the cutting edge thereof. The bushing region further is provided as having an outer surface which defines with the axial extent of the blade lateral surfaces an axial dimension which is selected relative to the root portion pitch such that the outer surface of the bushing region is made to bear upon the root portion walls effecting the desired positioning of the radial axis of the blade.

It is yet a further feature of the preferred embodiment of the present invention to provide in a rotary blade cutter for cutting a length of corrugated tubing, a method of positioning the blade of the cutter within a root portion of the tubing. The method involves the mounting of a spacer to the cutter coaxially with the axis of rotation of the blade. The spacer is provided to invest the lateral surfaces of the blade centrally therewithin and as having a generally circular periphery extending radially outwardly from the axis of rotation of the blade to a bushing region. The bushing region is configured to be received between the walls of the root portion of the tubing and terminates inwardly of the outer diameter of the blade to reveal at least a portion of the cutting edge thereof. The bushing region further is provided as having an outer surface which defines an axial dimension with the axial extent of the blade lateral surfaces. This axial dimension is selected relative to the root portion pitch such that when the blade is disposed within the root portion, the outer surface of the bushing region is made to bear upon the root portion walls effecting an alignment of the radial axis of the blade which defines the plane of rotation of the blade about the surface of the as being generally equidistant from the side walls of the root portion and as being generally perpendicular to the central longitudinal axis of the tubing.

The present invention, accordingly, comprises the apparatus and method possessing the construction, combination of elements, and arrangement of parts and steps which are exemplified in the detailed disclosure to follow. Advantages of the present invention include a rotary blade spacer for a corrugated tubing cutter which assures that the blade is centered within the root of the corrugation to achieve a straight cut. Additional advantages include a spacer construction which is economical to manufacture, and which may be readily employed in existing tubing cutter designs. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein:

FIG. 1 is a front view of conventional C-clamp type, rotary blade cutter as adapted according to the prior art for use in the cutting of corrugated tubing;

FIG. 2 is an enlarged, fragmentary view of the tubing cutter of FIG. 1 illustrating a misalignment of the rotary blade within a root portion of a length of corrugated tubing;

FIG. 3 is a longitudinal side view showing a section of a length of corrugated tubing in enhanced detail;

FIG. 6A is an enlarged, fragmentary view of the tubing cutter of FIG. 4 illustrating the initial alignment of the rotary blade assembly within a root portion of a length of corrugated tubing;

FIG. 6B is a continuing view as in FIG. 6A illustrating the further alignment of the rotary blade assembly within the tubing root portion as the cutting of the tubing progresses; and FIG. 7 is a perspective view of one of a pair of guide members which constitutes a preferred embodiment of the spacer of the present invention.

Figure 4:
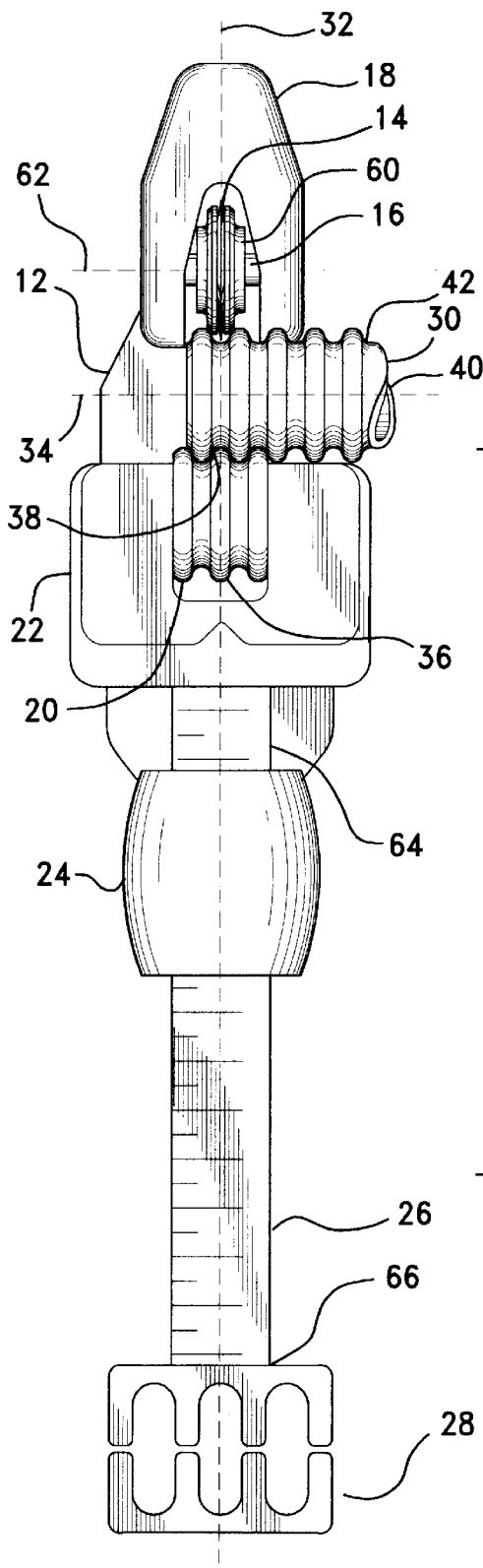
FIG. 4 is a front view of a representative C-clamp type, rotary blade tubing cutter as modified according to the present invention to include a blade guide spacer for effecting an alignment of the cutting blade in the cutting of corrugated tubing.

The drawings will be described further in connection with the following Detailed Description of the Invention.

DETAILED DESCRIPTION OF THE INVENTION

Certain terminology may be employed in the description to follow for convenience rather than for any limiting purpose. For example, the terms "forward," "rearward," "right," "left," "upper," and "lower" designate directions in the drawings to which reference is made, with the terms "inward" and "outward" referring, respectively, to directions toward and away from the center of the referenced element, and the terms "radial" and "axial" referring, respectively, to directions perpendicular and parallel to the longitudinal central axis of the referenced element. Terminology of similar import other than the words specifically mentioned above likewise is to be considered as being used for purposes of convenience rather than in any limiting sense.

For the purposes of the discourse to follow, the precepts of the invention herein involved are described in connection with its incorporation into a conventional rotary blade, C-clamp type tubing cutter wherein a rotary blade is fixably mounted at one end of a C-shaped frame, with a support roller movably mounted on a carriage intermediate the blade and the other end of the frame. It will be appreciated, however, that aspects of the present invention may find utility in other devices or methods for cutting corrugated tubing. For example, the spacer of the invention may be incorporated into rotary blade cutting tools wherein the roller is held stationary relative to a rotary blade which is mounted on a movable carriage, or wherein the tubing rather than the tool is circumferentially rotated. Use within those such other devices and methods therefore should be considered to be expressly within the scope of the present invention.

Referring then to the figures wherein corresponding reference characters are used to designate corresponding elements throughout the several views, a length of corrugated tubing 30 of the type herein involved is shown in enhanced detail in FIG. 3. Tubing 30 typically is formed of a polyethylene-jacketed (not shown) stainless steel or the like, and is nominally sized from ⅜-inch to 1-inch as having a wall, 40, thickness of about 0.01-inch. As was described previously in connection with FIGS. 1 and 2, tubing 30 further is fabricated as having a peripheral surface, 42, which is formed of alternating circumferential crest portions, a pair of which are shown at 50 and 50' to be of generally hyperbolic axial cross section, and root portions, one of which was previously referenced at 38, which are of generally parabolic axial cross-section. Each of the crest portions 50 has opposing side walls, referenced at 52a–b for crest 50 and at 52a'–b' for crest 50', which extend radially outward from the central longitudinal axis 34 to define a major outer diameter, shown at 54, of the tubing. Each of root portions 38, in turn extends radially inward to a minor outer diameter, shown at 56, of the tubing, as defined between the mutually opposing side walls of each adjacent pair of crest portions 50. With respect to the representative root portion specifically designated at 38, such root is defined between the mutually opposing, radially-inwardly extending side walls 52b and 52a' of crest portions 50 and 50' to be of a predetermined axial pitch, represented at "p." Depending upon its nominal sizing, tubing 30 typically will be provided as having a major diameter of about 0.60-inch to about 1.30-inch and a corresponding minor diameter of about 0.40-inch to about 1.05-inch to define root portion depth or ridge height, commonly referenced at "h," of about 0.20–0.30 inch.

Turning then to FIG. 4, the tubing cutter 10 of FIG. 1 reappears generally at 10' as modified to include the blade spacer, 60, of the present invention. As in FIG. 1, cutter 10' involves an arrangement including a C-shaped frame, 12, and a generally disc-shaped cutting blade, 14, which is mounted at a first end, 18, of the frame 12 as journaled on an axle, 16, for rotation about the axis of rotation designated at 62. A roller, 20, is disposed in opposition to blade 14 as rotatably mounted on a carriage, 22. Again, roller 20 is shown to be optionally profiled as having a plurality of circumferential ridges 36 each configured to be received within a corresponding corrugation root portion 38 of the tubing. Carriage 22, in turn, is slidably movably mounted on the frame 12 intermediate a second end 24 thereof and blade 14. Pressure screw 26 is threadably received through a bore formed within the second end 24 of frame 12 as operably coupled one end, 64, in a force transmitting relationship with carriage 22 for advancing roller 20 toward blade 14. The other end, 66, of screw 26 is operably coupled to knob or handle 28 which is provided for the hand-operated rotation thereof controlling the advancement of carriage 22 along frame 12.

As in conventional operation, with a length of corrugated tubing 30 disposed and supported intermediate blade 14 and roller 20, and with blade 14 being received within corrugation root 38, cutter 10' may be revolved radially circumferentially about the tubing within the plane again represented by line 32. Plane 32 is defined relative to the longitudinal axis 34 of the tubing 30 by the radial axis of blade 14, which axis may be seen at 70 with momentary reference to FIG. 5. As cutter 10' is revolved and with advancement force being continuously applied to carriage 22 and roller 20 via the rotation of screw 26, the tubing wall 40 is cut successively deeper with each revolution of the cutter by the rotation of the blade 14 along the peripheral surface 42 of the tubing. However, and as was explained hereinbefore in connection with FIG. 2, any axial movement, of the blade within the corrugation root 38 can result in a skewed or otherwise off-axis cut, i.e., a cut which is not perpendicular to the longitudinal axis of the tubing. Such movement, again, may be caused by any number of factors, but typically is the result of a loose-fitting blade, a variation in the pitch of the tubing corrugations which effects a misalignment of the roller, or the operator failing to properly align the cutting blade within the center of the corrugation. In this regard, spacer 60 of the present invention is provided to effect the positioning of blade 14 within the root portion 38 of the tubing to define plane 32 as being generally perpendicular to the longitudinal axis 34 of the tubing.

Figure 5:
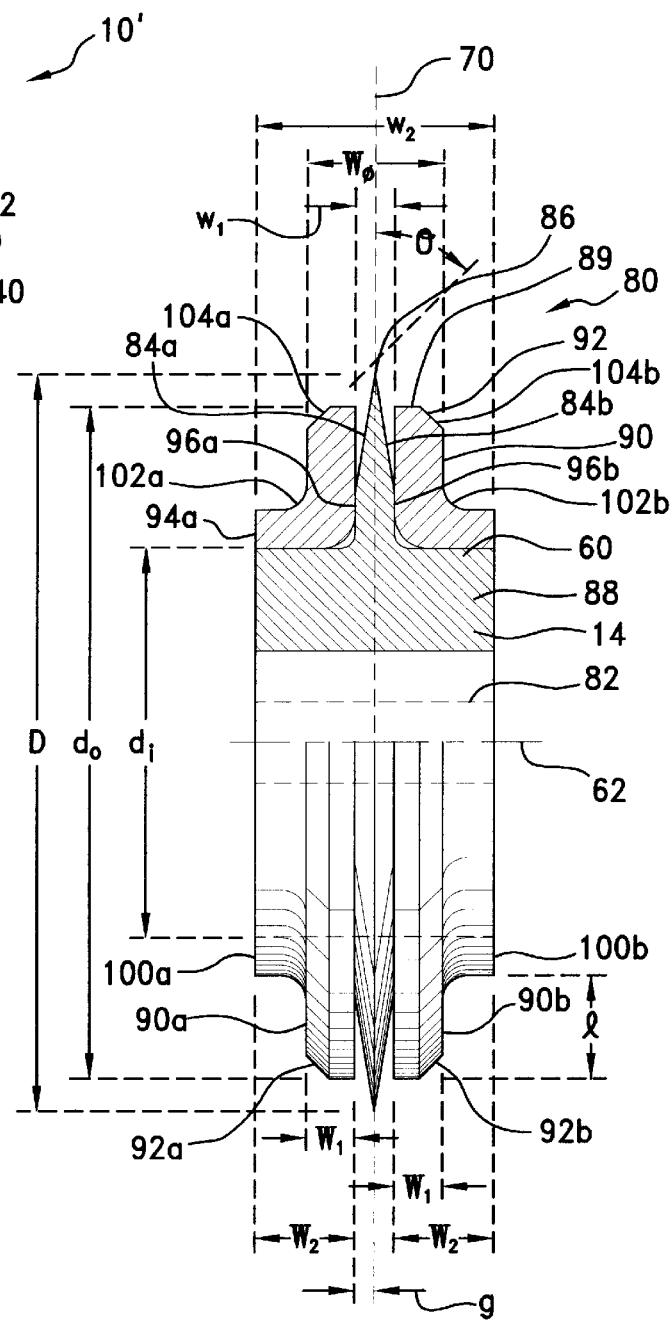
FIG. 5 is an enlarged, partially cross-sectional view of the spacer and blade assembly of FIG. 4.

Looking next then to FIG. 5, the blade and spacer assembly of cutter 10' is shown generally at 80 in enhanced detailed to illustrate the details of the construction thereof. With juxtaposed reference to the enhanced view of tubing 30 in FIG. 3, blade 14 may be seen to be of a given outer diameter, "D," and to have an opening or hub therethrough, shown in phantom at 82, for its mounting to axle 16 (FIG. 4). Blade 14 also may be seen to further include first and second lateral surfaces, 84a–b, which define a first axial extent, "$w_1$," therebetween. Lateral surfaces 84 each extend outwardly along blade radial axis 70 from rotational axis 62 to a common terminus defining the peripheral, generally frustoconical cutting edge, 86, of the blade. In cross-section, each of the lateral surface 84 defining edge 86 are mutually inwardly disposed at an angle of about 5° to intersect at axis 70. As is detailed hereinafter, at least a portion of the axial extents of lateral surfaces 84 may be received within the tubing root portion 38 disposing cutting edge 86 into bearing contact adjacency with the tubing surface 42. In the representative embodiment illustrated, blade 14 is shown to farther include an enlarged, generally cylindrical central portion, 88, which extends radially intermediate rotational axis 62 and the lateral surfaces 84. Central portion 88 defines a second axial extent, "$w_2$," of blade 14 which is larger than its first axial extent $w_1$.

With continued reference to FIG. 5, spacer 60 may be seen to be of an generally annular, preferably bifurcate construction which invests the blade lateral surfaces 84 centrally therewithin. In this regard, spacer 60 is configured as having a generally circular periphery, 89, which extends radially outwardly from the blade rotational axis 62 to a unitary bushing region, shown generally at 90. Bushing region 90 terminates inwardly of the blade diameter D at periphery 89 in defining the outer diameter, referenced at "$d_o$," of the spacer. It will be understood that to expose a portion of the axial extent of cutting edge 86 which is of a length sufficient to penetrate the thickness of the tubing wall 40 (FIG. 3), the spacer outer diameter $d_o$ is selected, depending upon the tubing wall thickness, to be about 0.05–0.10 inch less than the blade diameter D.

Bushing region 90 further is configured to be received between, for example, the tubing side walls 52b and 52a' bounding corrugation 38 as having an outer surface, 92, which defines with the first axial extent $w_1$ of the blade the axial dimension referenced at "$W_0$." For use with a representative ⅜–1 inch diameter tubing having a nominal pitch p opening of between about 0.140–0.250 inch, dimension $W_0$ will be selected to be about 0.145 inch. Referring additionally to FIGS. 6A and 6B wherein an illustrative sectioning of tubing 30 is sequentially depicted at 93 and 93', respectively, it may be appreciated that the axial dimension $W_0$ is selected with respect to the pitch p and surface geometry of tubing 30 such that the outer surface 92 of the bushing region is made to bear upon the root portion walls effecting the positive positioning of the blade radial axis 70. That is, as may be seen in FIG. 6A, as the blade edge 86 is initially received within the tubing corrugation, the bearing of the spacer outer surface 92 on the corresponding tubing side walls locates and aligns the blade axis such that the cutting plane 32 is defined as being generally equidistant from each of the side walls and as being generally perpendicular to the tubing longitudinal axis 34. Continuing to FIG. 6B, as cutter 10' is revolved about the tubing to urge the blade edge 86 progressively deeper into the tubing wall 40, the spacer outer surface advantageously is configured to continue bearing contact with the tubing side walls maintaining the position positioning of the blade.

Returning to FIG. 5 and looking additionally to the isometric view of FIG. 7, spacer 60 may be seen to be provided in a preferred embodiment as a discrete pair of generally annular, arbor-like first and second guide members, 94a (FIG. 7) and 94b, with blade 14 being interposed therebetween. Each of guide members 94 is provided an having a inward surface, 96a–b, disposed adjacent a corresponding lateral surface 84 of blade 14, and an outward surface which extends to the spacer periphery 89 to define a corresponding portion, 92a–b, of the bushing region outer surface 92. The corresponding bushing region portion, 90a–b, of each of the guide members 94 is of a first axial width, $W_1$, as determined by the following relationship:

$$W_1 = (W_0 - w_1)/2 \qquad (1)$$

Based on the above relationship, for the previous example of a ⅜–1 inch diameter tubing having a pitch p opening of between about 0.140–0.250 inch, dimension $W_1$ will be about 0.05 inch for a blade first axial extent $w_1$ of about 0.045 inch.

To accommodate the enlarged central portion 88 of the blade, each of guide members 94 is further provided as including a unitary central boss portion, 100a–b. Boss portions 100 each extend laterally of the spacer along axis 62 from a circumferential shoulder portion, 102a–b, to define a second axial extent, $W_2$, of each member, Advantageously, each of boss portions 100 may be configured as a sleeve having an inner diametric extent, $d_1$, sized to be interference fit over the corresponding side, 88a–b, of the blade central portion 88, preferably for the rotation of the members therewith. So configured, members 94 may be expeditiously interchanged or "quick changed" with other members with thinner or thicker bushing regions to adapt a single blade 14 and tool 10' for use with tubing of different sizes and corrugation pitches. Alternatively, and depending upon the configuration of blade 14, guide members 94 may be formed without boss or shoulder portions 100 or 102, or as otherwise being generally planar or disc-shaped.

In the preferred embodiment illustrated in FIGS. 5 and 7, the bushing region portion 90 of each member 94 is provided to be of a select axial length, referenced at "l" in FIG. 5, in extending radially outwardly from corresponding shoulder portion 102 to the periphery 89 of the spacer. Although length e is not critical, it will be appreciated to be dimensioned such that the shoulder portions 102 clear the major diameter of the tubing. Again, for the illustrative example, length e may be about 0.01 inch. Further in the preferred embodiment illustrated in FIGS. 5 and 7, the inward surfaces 96 of each member 94 are provided to be generally planar and to define a gap, referenced at "g" in FIG. 5 for member 94a, with the frustoconical cutting blade edge 86. Such gap g advantageously is provided to accommodate an inward, relative to axis 70, camming of the bushing region portions 90a–b effecting a corresponding decrease in the axial dimension $W_0$. In this regard, and as is shown at 104a–b, each of the outward surfaces of members 94 extends to define the corresponding portion of spacer outer surface 92 as being disposed at an inward angle, referenced at θ in FIG. 5, with respect to the blade radial axis 70. Angle θ in preferably is between about 5° and about 45°.

As may be seen with additional, comparative reference to FIGS. 6A–B, the angled surfaces 104 function as cammning surfaces responsive to bearing of the root portion side walls 50 and 52 thereon. That is, as the cutting of the tubing progresses with bushing region 90 being urged further into the tubing corrugation 38, the reaction force developed between the parabolically-angled tubing walls 52b and 52a', and the spacer surfaces 104a–b is directed on spacer bushing portion 90 as an axial inwardly vectored force component. Such component effects an inward deflection of bushing region portions 90a–b, and a resultant compression of the gap width g from the dimension $W_0$ shown in FIG. 6A, to the smaller dimension $W_0'$ shown in FIG. 6B. Preferably, the described deflection is resiliently effected such that spacer bushing region portions 90a–b each are normally biased to define gap width g with blade edge 86. In this way, one size of a spacer 60 advantageously may accommodate both a range of tubing diameters and pitches, and any minor dimensional tolerances in the corrugation spacing of the tubing. Although spacer camming surfaces 104 are shown as being angled to develop the aforementioned force component, the surfaces alternatively may be radiused or rounded, or otherwise configured to have a triangular, diamond, or tapered cross-section providing the desired axial inwardly-directed force.

Depending upon its material of construction, spacer 60 of the present invention may be fabricated by molding, machining, or other conventional forming processes. Preferred materials are broadly classified as "resilient" or otherwise those materials which exhibit flexural properties such as hysteresis or elastic deformation, i.e., spring or "snap-back," to accommodate the deflection of the spacer bushing region portions within the tubing corrugations. Such materials includes plastics, rubbers, and other polymeric materials, as well as ferrous or nonferrous metals such as mild steel, stainless steel, and brass. Preferred plastic materials include poly(ether ether ketones), polyimides, high molecular weight polyethylenes, polypropylenes, polyetherimides, polybutylene terephthalates, nylons, fluoropolymers, polysulfones, polyesters, and particularly acetal homo and copolymers such as Delrin® M90 (E. I. duPont de Nemours & Co., Wilmington, Del.). The selected metal or plastic material may be annealed or otherwise heat or chemically treated to achieve the desired degree of resiliency.

Thus, a unique rotary blade spacer for a cutting implement used in the cutting of corrugated or convoluted tubing is described which facilitates the cutting of the tubing and assures a straight cut. Such a cut prepares the tubing end for a complete flaring and allows the end to be connected to a fitting or other coupling with flight-tight confidence.

As it is anticipated that certain changes may be made in the present invention without departing from the precepts herein involved, it is intended that all matter contained in the foregoing description shall be interpreted in as illustrative rather than in a limiting sense. All references cited herein are expressly incorporated by reference.

What is claimed is:

1. In a cutter for cutting a length of corrugated tubing having a circumferential surface formed of alternating crest portions having opposing side walls extending radially outwardly from a central longitudinal axis of the tubing and radially inwardly extending root portions of a predetermined pitch defined between mutually opposing side walls of each adjacent pair of crest portions, the cutter being of a variety which supports the tubing between a roller and an oppositely-disposed rotary cutting blade of a given outer diameter having first and second lateral surfaces which define a first axial extent of the blade therebetween and which extend outwardly along a radial axis from a longitudinal axis of rotation of the blade to a peripheral, generally frustoconical cutting edge, at least a portion of the lateral surfaces being receivable within the root portions of the tubing disposing the cutting edge into bearing contact with the surface of the tubing for the relative rotation of the blade circumferentially about the tubing within a plane defined by the radial axis of the blade, the improvement which comprises a spacer being mounted to the cutter coaxially with the axis of rotation of the blade for positioning the blade within the root portion of the tubing such that the radial axis of the blade is aligned within the root portion to define said plane as being generally equidistant from the side walls of the root portion and as being generally perpendicular to the central longitudinal axis of the tubing, said spacer investing the lateral surfaces of the blade centrally therewithin and having a generally circular periphery extending radially outwardly from the axis of rotation of the blade to a bushing region which is configured to be received between the walls of the root portion of the tubing and which terminates inwardly of the outer diameter of the blade to reveal at least a portion of the cutting edge thereof, said bushing region having an outer surface which defines with the first axial extent of the blade lateral surfaces an axial dimension which is selected relative to the root portion pitch such that said outer surface of said bushing region is made to bear upon the root portion walls effecting said positioning of the radial axis of the blade.

2. The improvement of claim 1 wherein said spacer comprises generally annular first and second guide members each having an inward surface disposed adjacent a corresponding lateral surface of the blade and an outward surface which extends to the periphery of said spacer to define a corresponding portion of the outer surface of said bushing region.

3. The improvement of claim 2 wherein each of said inward surfaces of said guide members defines a gap with the cutting edge of the blade, and wherein the outer surface of said bushing region is configured to effect an inward cammning of said region within each said gap responsive to the bearing of the root portion side walls thereon.

4. The improvement of claim 3 wherein each of said outward surfaces of said guide members extends to define said corresponding portion of the outer surface of said bushing region as being mutually disposed at an inward angle with respect to the radial axis of the blade.

5. The improvement of claim 4 wherein said angle is about 5° to about 45°.

6. The improvement of claim 2 wherein said cutting blade includes a cylindrical central portion of which extends radially intermediate the axis of rotation and the lateral surfaces of the blade and which defines a second axial extent of the blade greater than the first axial extent, and wherein each of said guide members includes a central boss portion received over the central portion of the blade.

7. The improvement of claim 6 wherein said boss portion of each of said guide members is interference fit over the central portion of the blade.

8. A space mountable to a cutter for cutting a length of corrugated tubing having a circumferential surface formed of alternating crest portions having opposing side walls extending radially outwardly from a central longitudinal axis of the tubing and radially inwardly extending root portions of a predetermined pitch defined between mutually opposing side walls of each adjacent pair of crest portions, the cutter being of a variety including a rotary cutting blade of a given outer diameter and having first and second lateral surfaces which define a first axial extent of the blade therebetween and which extend outwardly along a radial axis from a longitudinal axis of rotation of the blade to a peripheral, generally frustoconical cutting edge, at least a portion of the lateral surfaces being receivable within the root portions of the tubing disposing the cutting edge into bearing contact with the surface of the tubing for the relative rotation of the blade circumferentially about the tubing within a plane defined by the radial axis of the blade, said spacer mountable to the cutter coaxially with the axis of rotation of the blade for positioning the blade within the root portion of the tubing such that the radial axis of the blade is aligned within the root portion to define said plane as being generally equidistant from the side walls of the root portion and as being generally perpendicular to the central longitudinal axis of the tubing, said spacer investing the lateral surfaces of the blade centrally therewithin and having a generally circular periphery extending radially outwardly from the axis of rotation of the blade to a bushing region which is configured to be received between the walls of the root portion of the tubing and which terminates inwardly of the outer diameter of the blade to reveal at least a portion of the cutting edge thereof, said bushing region having an outer surface which defines with the first axial extent of the blade lateral surfaces an axial dimension which is selected relative to the root portion pitch such that said outer surface of said bushing region is made to bear upon the root portion walls effecting said positioning of the radial axis of the blade.

9. The spacer of claim 8 which comprises generally annular first and second guide members each having an inward surface disposable adjacent a corresponding lateral surface of the blade and an outward surface which extends to the periphery of said spacer to define a corresponding portion of the outer surface of said bushing region.

10. The spacer of claim 9 wherein each of said inward surfaces of said guide members defines a gap with the cutting edge of the blade, and wherein the outer surface of said bushing region is configured to effect an inward camming of said region within each said gap responsive to the bearing of the root portion side walls thereon.

11. The spacer of claim 10 wherein each of said outward surfaces of said guide members extends to define said corresponding portion of the outer surface of said bushing region as being mutually disposed at an inward angle with respect to the radial axis of the blade.

12. The spacer of claim 11 wherein said angle is about 5° to about 45°.

13. The spacer of claim 9 wherein said cutting blade includes a cylindrical central portion of which extends radially intermediate the axis of rotation and the lateral surfaces of the blade and which defines a second axial extent of the blade greater than the first axial extent, and wherein each of said guide members includes a central boss portion of a diametric extent configured to be received over the central portion of the blade.

14. The spacer of claim 13 wherein said boss portion of each of said guide members is configured for an interference fit over the central portion of the blade.

15. In a cutter for cutting a length of corrugated tubing having a circumferential surface formed of alternating crest portions having opposing side walls extending radially outwardly from a central longitudinal axis of the tubing and radially inwardly extending root portions of a predetermined pitch defined between mutually opposing side walls of each adjacent pair of crest portions, the cutter being of a variety including a rotary cutting blade of a given outer diameter and having first and second lateral surfaces which define a first axial extent of the blade therebetween and which extend outwardly along a radial axis from a longitudinal axis of rotation of the blade to a peripheral, generally frustoconical cutting edge, at least a portion of the lateral surfaces being receivable within the root portions of the tubing disposing the cutting edge into bearing contact with the surface of the tubing for the relative rotation of the blade circumferentially about the tubing within a plane defined by the radial axis of the blade, a method of positioning the blade within the root portion of the tubing, said method comprising the steps of:

(a) mounting a spacer to the cutter coaxially with the axis of rotation of the blade, said spacer investing the lateral surfaces of the blade centrally therewithin and having a generally circular periphery extending radially outwardly from the axis of rotation of the blade to a bushing region which is configured to be received between the walls of the root portion of the tubing and which terminates inwardly of the outer diameter of the blade to reveal at least a portion of the cutting edge thereof, said bushing region having an outer surface which defines with the first axial extent of the blade lateral surfaces an axial dimension; and (b) disposing the blade within the root portion of the tubing,
whereby said axial dimension is selected relative to the root portion pitch such that said outer surface of said bushing region is made to bear upon the root portion walls effecting an alignment of the radial axis of the blade which defines said plane as being generally equidistant from the side walls of the root portion and as being generally perpendicular to the central longitudinal axis of the tubing.

16. The method of claim 15 wherein said spacer comprises generally annular first and second guide members each having an inward surface disposed adjacent a corresponding lateral surface of the blade and an outward surface which extends to the periphery of said spacer to define a corresponding portion of the outer surface of said bushing region.

17. The method of claim 16 wherein each of said inward surfaces of said guide members defines a gap with the cutting edge of the blade, and wherein the outer surface of said bushing region is configured to effect an inward camming of said region within each said gap responsive to the bearing of the root portion side walls thereon.

18. The method of claim 17 wherein each of said outward surfaces of said guide members extends to define said corresponding portion of the outer surface of said bushing region as being mutually disposed at an inward angle with respect to the radial axis of the blade.

19. The method of claim 18 wherein said angle is about 5° to about 45°.

20. The method of claim 16 wherein said cutting blade includes a cylindrical central portion of which extends radially intermediate the axis of rotation and the lateral surfaces of the blade and which defines a second axial extent of the blade greater than the first axial extent, and wherein each of said guide members includes a central boss portion received over the central portion of the blade.

21. The method of claim 20 wherein said boss portion of each of said guide members is interference fit over the central portion of the blade.

* * * * *